United States Patent [19]

Ambrosi et al.

[11] Patent Number: 5,729,569
[45] Date of Patent: Mar. 17, 1998

[54] SUBMERGED ARC FURNACE WITH VERTICALLY MOVABLE FRAME

[75] Inventors: Luciano Ambrosi, Moers; Franz Schulze-Hagen, Dinslaken; Hermann Cepin, Duisburg, all of Germany

[73] Assignee: Mannesmann Aktiengesellschaft, Düsseldorf, Germany

[21] Appl. No.: 652,587

[22] PCT Filed: Nov. 30, 1994

[86] PCT No.: PCT/DE94/01469

§ 371 Date: Jul. 11, 1996

§ 102(e) Date: Jul. 11, 1996

[87] PCT Pub. No.: WO95/16335

PCT Pub. Date: Jun. 15, 1995

[30] Foreign Application Priority Data

Dec. 8, 1993 [DE] Germany .................. 43 42 511.9

[51] Int. Cl.[6] ............................................. H05B 7/12
[52] U.S. Cl. ........................... 373/95; 373/52; 373/94
[58] Field of Search ........................... 373/2, 60, 69, 373/73, 94, 95, 100, 51, 52

[56] References Cited

U.S. PATENT DOCUMENTS

| | | | |
|---|---|---|---|
| 1,443,024 | 1/1923 | Keeney | 373/72 |
| 2,297,484 | 9/1942 | Lehrer et al. | 373/95 |
| 2,686,824 | 8/1954 | Evans et al. | 373/95 |
| 3,510,562 | 5/1970 | Frauenstein | 373/94 |
| 4,227,030 | 10/1980 | Osterwold | 373/96 |
| 4,238,634 | 12/1980 | Krogsrud | 373/96 |
| 4,292,460 | 9/1981 | Frolov et al. | 373/95 |
| 4,295,001 | 10/1981 | Britton | 373/96 |
| 4,357,485 | 11/1982 | Lamarque | 373/95 |
| 4,759,032 | 7/1988 | Willis | 373/95 |

FOREIGN PATENT DOCUMENTS

| | | |
|---|---|---|
| 2683421 | 5/1993 | France . |
| 1026017 | 3/1958 | Germany . |

*Primary Examiner*—Tu B. Hoang
*Attorney, Agent, or Firm*—Cohen, Pontani, Lieberman, Pavane

[57] ABSTRACT

A submerged arc furnace with an open slag bath, having a vertically movable frame which is arranged above the furnace which is closed by a cover. An electrode mount and an electrode filling device are arranged on the frame. A platform is provided on which the frame is supported via at least three regulating cylinders. The platform, which is arranged above the furnace cover, is configured as a maintenance platform on which, for each electrode, there is provided a sealing unit which has components for the horizontal and vertical sealing of the free surfaces between the electrodes and the electrode passage openings of the cover.

11 Claims, 1 Drawing Sheet

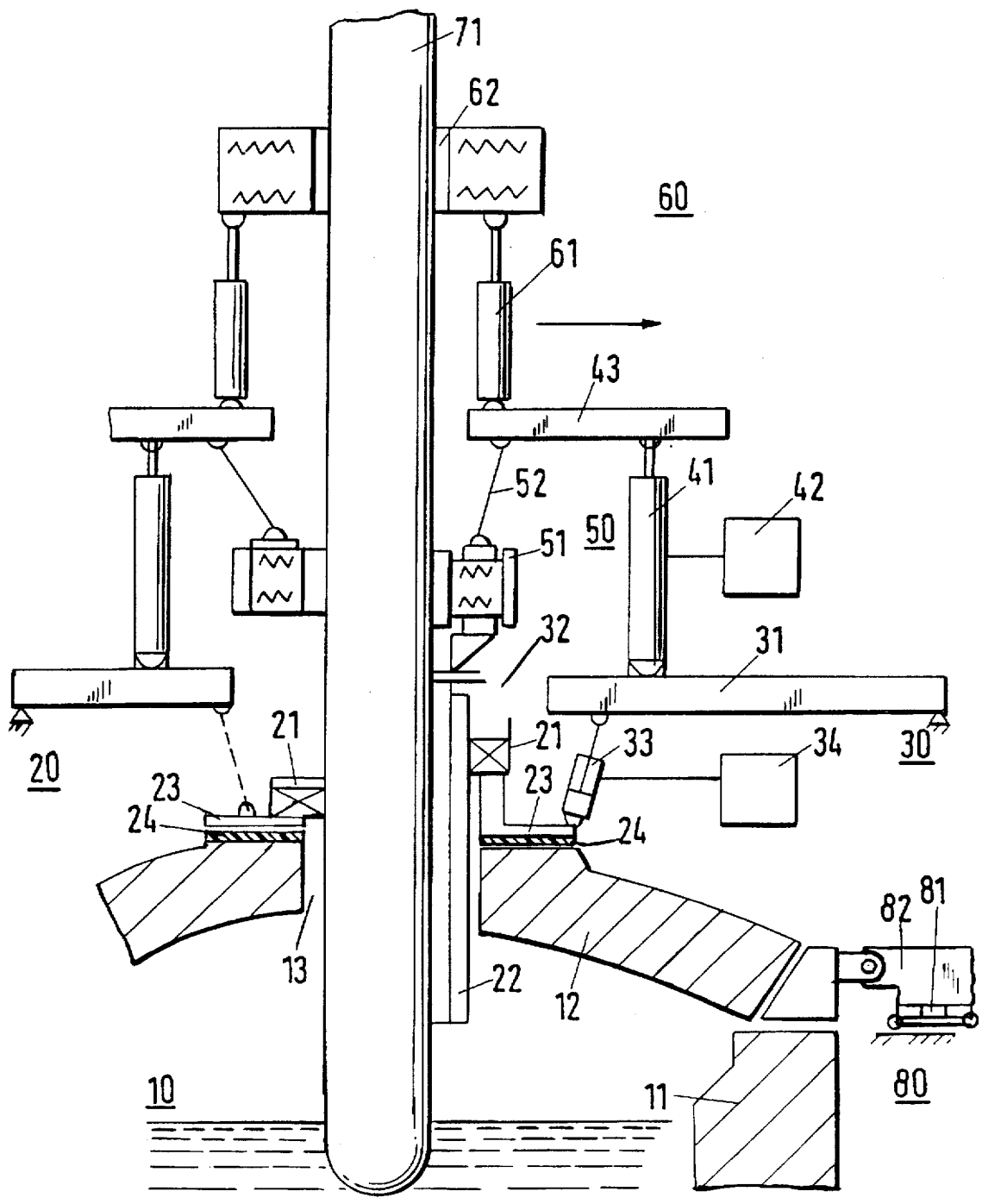

SUBMERGED ARC FURNACE WITH VERTICALLY MOVABLE FRAME

BACKGROUND OF THE INVENTION

1. Field of the Invention

The invention relates to a submerged arc furnace with open slag bath, in particular for melting powdery batches, having a vertically movable frame which is arranged above the furnace closed by a cover. An electrode mount and an electrode charging device are arranged on the frame. The invention further relates to a device for sealing the electrode passage openings in the cover of a submerged arc furnace.

2. Description of the Prior Art

Electrodes in reduction furnaces are consumed at the electrode tip and must be charged during operation. Such a charging device for the electrodes of electric furnaces, having a double-acting hydraulic drive consisting of a piston/cylinder arrangement and intended for pushing the electrodes through the contact mount is disclosed, for example, by DE AS 1 440 991. The charging device which is disclosed by this document, and also the electrode mount, are fastened on a frame which is borne by an electrode winch. In this document, means are indicated with which shock-free and speed-regulating charging of the individual electrodes through the electrode mount can be carried out uniformly during the entire lowering operation. A simultaneously controlled lowering of the electrodes is as infrequent as a reliable sealing of the electrode passages through the cover.

The document EP 0 093 070 B1 discloses a sealing system for electrodes, in which an annular stuffing box is pressed onto the outer surface of the electrode. Furthermore, a chamber is provided which encompasses the electrode and can be loaded using compressed air. The entire sealing ring is screwed fast to the furnace cover and thus cannot be easily detached from the cover.

The document DE OS 24 55 202 discloses a main ring seal for use in conjunction with an arc furnace which has a furnace cover of fire-resistant material, in which excessively filled openings are provided. The main ring seal is supported above, and independently of, the fire-resistant furnace cover using a support structure. For this purpose, pivotable connecting elements are used which permit a lateral movement and an offset of the main ring seal with respect to the furnace cover. Furthermore, the main ring seal can be sealed off in relation to the furnace cover using an adjustable cylindrically designed part. An annular cover seal is provided on the cover and is dimensioned such that it can be adjusted in a telecoping manner relative to the lower cylindrical part with close contact, the contact being improved further by means of a resilient element. This complicated construction only permits a cover change which involves a high degree of outlay.

SUMMARY OF THE INVENTION

Accordingly, it is an object of the present invention to provide a submerged arc furnace and a sealing device for the electrode passage openings in the cover, both of which guarantee reliable control of the electrode movement and with which, in a maintenance-friendly manner, an increase in the useful operational time may be achieved.

According to the invention, piston/cylinder arrangements are connected to the frame to which the electrode mount and the filling device are fastened. The piston/cylinder arrangements are supported on a stationary regulating platform. Using the movement of this frame, the electrodes, as a rule 3 are used, are moved simultaneously. The filling and remounting of each individual electrode are achieved using the clamping rings in combination with the mount. The simultaneous regulation of all three electrodes is possible in the case of submerged arc furnaces which operate with an open slag bath. Such furnaces are used in the processing of dusts or similar raw materials. In this case, the powdery batches are preferably charged via hollow electrodes. The remaining charging material, predominantly coke and additives, is charged via charging pipes onto the hot, liquid slag and floats on the slag. The slag surface and the batch surface have, in this case, no noticeable unevenness.

The electrode passages through the furnace cover can be designed in a dust-tight or gas-tight manner. In this respect, a particular problem is posed by the thermal deformation of the cover. The present invention therefore a seal on the edge of the cover opening during the operation of the submerged arc furnace, which seal, at a constant force, absorbs any arbitrary movements parallel to the electrode axis and closes off the cover opening vertically in a reliable manner.

The covers are conventionally bricked up and are subjected to incalculable wear. This results in their having to be changed spontaneously. In the case of the inventive seal of the electrode passages, this is possible in a simple manner and in the shortest possible time. For this purpose, the pressure cylinders which are fastened to the maintenance platform are driven back, the seal being detached from the furnace cover. At the same time, the electrodes are driven out of the electrode passages. Subsequently, the free cover can be removed using simple means and a prepared overhauled cover can in turn be placed on the furnace in a simple manner. The electrode passages are then closed once more, the electrodes are brought into the operating position and production can be resumed once more.

In another embodiment of the invention, each electrode is surrounded in the region of the sealing unit by a sealing sleeve, which is encompassed by the sealing frame. The outer surface of the sealing sleeve is mechanically worked, so that it can slide in the sealing ring frame easily and without developing a leak. In the case of a planned cover change, the electrode is then withdrawn into the sealing sleeve and both are moved vertically to such an extent that their tips are located above the horizontal surface of the sealing flange. Then, by means of actuating the piston/cylinder unit, the sealing unit is lifted to such an extent that the cover can be moved horizontally freely under the latter.

The mounting rings encompassing the electrode are designed in one piece with the advantage of maintaining their exact shape and low wear. The rings are suspended in an insulated manner; which avoids power losses and fulfills safety aspects for walking on the frame.

The power supply is minimized overall in terms of its length. This is also achieved, inter alia, by means of the use of the frame and the omission of special outriggers, since the center of gravity of the cable, including the electrodes, is lower down than in the case of the conventional design.

As a result of the two-point engagement of the electrodes, namely the electrode mount and the charging device, and the simultaneous movement of all the electrodes in the vertical direction, the electrodes are free of lateral forces.

BRIEF DESCRIPTION OF THE DRAWING

One example of the invention is set forth in the appended drawing. In this case, the single FIGURE shows a detail of a submerged arc furnace with a cover section.

DETAILED DESCRIPTION OF THE PREFERRED EMBODIMENTS

A vessel 11 is shown in the drawing with a cover 12 of a submerged arc furnace 10. An electrode 71 projects into the vessel 11 through a cover opening 13.

The electrode 71 is gripped by a clamping ring 62 of a charging device 60, which is supported on a frame 43 via a lifting cylinder 61.

Fastened on the frame 43 is an electrode mounting holder 52, of an electrode mounting device 50 which includes an electrode mounting ring 51, mounted to the holder 52, which likewise encompasses the electrode 71.

The frame 43 is supported via a regulating cylinder 41, which is connected to a synchronous controller 42. The cylinder 41 is mounted on a regulating and maintenance platform 31 of a maintenance unit 30. The regulating and maintenance platform 31 in this case has a passage 32, in the area of which there is fastened a piston/cylinder unit 33, which is connected to a control unit 34.

The piston/cylinder unit 33 is also connected to a sealing unit 20. This sealing unit 20 has a flange 23 which is guided parallel to the cover opening 13. An elastically deformable material 24 is provided between the flange and the cover 12. It is possible to use a heat-resistant silicon compound or a metallic compensator as the material 24. The flange 23 is connected to a sealing frame 23, which directly encompasses the electrode 71—as shown on the left-hand side of the figure —or encompasses a sealing sleeve 22. The use of a sealing sleeve 22 has the advantage that defined relationships between the contact surfaces are produced by means of mechanical working of the outer surface. Leak-tight and reliable sliding of the electrode unit during the planned cover changes is thus guaranteed.

During a cover change, use is made of a lifting and driving unit 80, which has a lifting element 81 and a driving element 82, following the detachment of the flanges 23 from the cover opening and the withdrawal of the electrode 71 and, if appropriate, of the sealing sleeve 22, the cover 12 is moved away from the vessel 11 without impediment.

We claim:

1. A submerged arc furnace with open slag bath, comprising: a furnace vessel; a cover arranged on the furnace vessel and having at least one opening therein; a vertically movable frame arranged above the vessel; an electrode mount arranged on the frame; an electrode charging device arranged on the frame; at least one electrode held by the electrode mount and the electrode charging device so as to pass through the cover opening at a distance from edge surfaces of the opening; a maintenance platform arranged above the cover; at least three regulating cylinders arranged to support the frame on the platform; and, sealing means provided for each electrode for sealing opposing free surfaces between the electrode and the cover opening in both horizontal and vertical directions.

2. A submerged arc furnace as defined in claim 1, and further comprising a synchronous controller operatively connected to the regulating cylinders.

3. A submerged arc furnace as defined in claim 1, wherein the sealing means includes a sealing frame arranged to encompass the at least one electrode as a closed ring.

4. A submerged arc furnace as defined in claim 3, wherein the sealing means includes a sealing sleeve arranged between the sealing frame and the electrode, coaxial to the electrode, the sealing sleeve having an outer surface which is mechanically worked so that it can be brought into sliding contact with an inner surface of the sealing frame.

5. A submerged arc furnace as defined in claim 3, wherein the sealing means includes a flange provided on the sealing frame so as to be parallel to the cover, and a seal arranged to seal the flange against an edge of the cover opening.

6. A submerged arc furnace as defined in claims 5, wherein the seal is made of an elastically deformable sealing material.

7. A submerged arc furnace as defined in claim 6, wherein the seal is made of a silicone compound.

8. A submerged arc furnace comprising: a furnace vessel; a cover arranged on the furnace vessel and having electrode passage opening; electrodes arranged to pass through the electrode passage openings in the cover; and means for sealing the electrode passage openings in the cover, the sealing means including a platform, a sealing frame arranged to encompass and seal free surfaces of the electrodes in a horizontal direction, a flange connected to the sealing frame parallel to the cover openings and in contact with the cover so as to seal the electrodes in a vertical direction, a piston-cylinder unit suspended on the platform and connected to the sealing frame and the flange, and a control unit operatively connected to the piston-cylinder unit, the piston-cylinder control unit being operative to exert a constant force on the flange when a change in height of an edge of the cover opening occurs.

9. A submerged arc furnace as defined in claim 8, wherein the control unit is operative to actuate the piston/cylinder unit to lift the flange off the edge of the cover opening.

10. A submerged arc furnace as defined in claim 9, and further comprising lifting and driving means for moving the cover into a repair position away from the furnace vessel when the flange is lifted.

11. A submerged arc furnace with open slag bath, comprising: a furnace vessel; a cover arranged on the furnace vessel and having at least one opening therein; a vertically movable frame arranged above the vessel; an electrode mount arranged on the frame; an electrode charging device arranged on the frame; at least one electrode held by the electrode mount and the electrode charging device so as to pass through the cover opening at a distance from edge surfaces of the opening; a maintenance platform arranged above the cover; at least three regulating cylinders arranged to support the frame on the platform; and, sealing means provided for each electrode for sealing opposing free surfaces between the electrode and the cover opening in both horizontal and vertical directions, the sealing means including a flange provided on the sealing frame so as to be parallel to the cover, and a seal arranged to seal the flange against an edge of the cover opening.

* * * * *